United States Patent Office 3,397,187
Patented Aug. 13, 1968

3,397,187
RESINS CONTAINING THE REPEATING
BENZOTHIAZOLE STRUCTURE
William D. Mecum, Wyckoff, N.J., assignor to Abex Corporation, New York, N.Y., a corporation of Delaware
No Drawing. Filed Dec. 30, 1966, Ser. No. 606,039
3 Claims. (Cl. 260—79)

ABSTRACT OF THE DISCLOSURE

Carboxylated polybenzothiazole resin rendered soluble, as in dimethylacetamide, by reacting carboxyl potentials in increments with polybenzothiazole resin while cycling the temperature during reaction.

---

This invention relates to polybenzothiazole resins and in particular to the preparation of such resins to impart thereto enhanced resistance to oxidation at high temperatures as exhibited by improved flexural strength under oxidizing conditions.

The polybenzothiazole resin of United States Patent No. 3,047,543, as hereinafter shown in Example B, can be used to bond glass fabric laminates (No. 181 glass fabric) having a 700° F. flexural strength of about 19,000 p.s.i. after heating in air for 24 hours at 700° F. In accordance with the present invention, a polybenzothiazole resin is possible which is of superior strength under these same conditions. This is accomplished by introducing into the resin molecule an aromatic carboxylic acid potential in excess of that which may be consumed in benezothiazole formation in the basic polybenzothiazole structure characterized by repeated units,

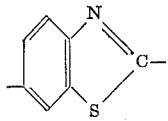

and rendering the resin at least partially soluble.

Example A.—Preparation of 4-aminophthalimide

A slurry of purified 4-nitrophthalimide in room temperature distilled water was made by dispersing 125 grams of the 4-nitrophthalimide in 1775 grams of distilled water. Then were added, with stirring and five minutes apart, four 102 gram portions of $Na_2S_2O_4$. Noted exotherms were an follows:

| | ° F. |
|---|---|
| First addition | 75 to 95 |
| Second addition | 95 to 121 |
| Third addition | 121 to 131 |
| Fourth addition | None |

The first addition produced a bright yellow color. Following additions darkened and intensified the yellow color.

The reduced slurry was air cooled for fifteen minutes and then water cooled in a period of about an hour to a temperature of about 70° F. The rather thixotropic slurry was then divided into three equal portions and filtered into three cakes and pressed as dry as possible. The average weight of these first wet cakes was 147 grams.

Each of these wet cakes was dispersed in 420 grams of 50° F. distilled water and again filtered and pressed as dry as possible to an average weight of 61.0 grams. After air drying in a strong draft of air overnight the yield was 70.0 grams of dry cakes. These were ground to a powder and dissolved in 210 grams of dimethylacetamide and again divided into three equal portions.

Each of these portions was drowned in 430 millilitres of cold distilled water and the bright yellow precipitate was filtered off and worked to as dry a cake as possible. The three wet cakes weighed 134.0 grams. After air drying overnight in a strong draft the final weight of the dry product was 51.5 grams. After grinding the product was a bright yellow powder.

A thin pad of this powder on a 500° F. hot plate grows a dense mass of bright yellow needles from a lightly sintered base without any definite melting. Melting at this heat suggests poor reduction and unconverted 4-nitrophthalimide.

On shock heating at 600° F. the product is 57.0% sublimable. The residue is a clear brown resin. Higher yields of resin and lower volatile suggest more open ring product.

A 10% solution of Example A in dimethylacetamide (refractive index 1.4360 at 25° C.) has a refractive index of 1.4540.

Although the melting point of anything which can resinify as readily as 4-aminophthalimide is not truly reliable, shock heating in capillary tubes suggest a melt point of about 570° F. for Example A.

Infra-red spectra suggest that Example A has the proper structure for the 4-aminophthalimide.

Example A is used in preparing Example C resin which is used in Example 2 laminate.

Example B.—Polybenzothiazole resin from mixed toluidines and sulfur

In this example distilled mixed (60% ortho-37% para and 3% meta) toluidines, 2.0 molar parts, and sulfur, 8.0 atom parts were heated to slow reflux (about 390° F.) in about 45 minutes. The reaction evolved $H_2S$ at a rapid rate above 370° F. It was held at a temperature of 380–400° F. for a total of about 7.0 hours and then at a temperature of 400–420° F. for an additional 7.0 hours to a yield of 334.0 grams of dark brown resin having a Tempilstik melt point of about 250° F. This resin was partially soluble in dimethylacetamide. The $H_2S$ off was about 144.0 grams or 70.7% of the theoretical 6.0 molar parts.

This resin represents a product made in the same manner as Example C but without the use of 4-aminophthalimide.

Example C.—Carboxylated polybenzothiazole resin from toluidines, sulfur and 4-aminophthalimide Mixed distilled toluidines 150 grams, and sulfur, 195 grams, were heated to about 370° F. in about 50 minutes. At this point $H_2S$ was being evolved at a fairly rapid rate and 20.0% of a 79.6 gram portion of 4-aminophthalimide was added. The heat was then raised to about 400° F. in about 15 minutes and then dropped back to about 350° F. in about 15 minutes. Another 20.0% of the 4-aminophthalimide was then added and the up-down heat cycle was repeated. When all 79.6 grams of 4-aminophthalimide had been added (5 up-down cycles) the temperature was elevated to 400–420° F. and maintained for about eleven hours. The yield was 328.0 grams of a dark brown resin which was cooled and solidified on the sides of the flask and then chipped out.

The melting point was about 275° F. and the product was partially soluble in dimethylacetamide. After ball milling for 24 hours as a 50% solution in dimethylacetamide, the product could be impregnated into a glass fabric without notable strain-out of resin solids. After proper dry-out, this coated fabric was flexible and could be readily handled without flake-off of resin solids.

Example D.—Low polymer resin suitable for curing by trimellitic carboxyl potentials Para toluidine, 321.0 grams, para-phenylenediamine, 162.0 grams, sulfur 480.0 grams and triethylamine, N ($C_2H_5$)$_3$, 7.5 grams were heated from room temperature to 280° F. in about 37 minutes. Evolution of $H_2S$ started at this point. The temperature was then raised to 340° F. in 13 minutes and to 391° in about 7.0 hours; then cooled under $N_2$ and allowed to stand under $N_2$ overnight. The next day the product was heated from room temperature to 360° F. in about 35 minutes and to 415° F. after 4.0 hours. It was then held for an additional 4.0 hours between 415° and 409° F. before cooling under $N_2$.

The yield was 680 grams of a black resin with a melting point of about 335° F. It was completely soluble in dimethylacetamide to be capable of pre-impregnation uses hereinafter described, and heat curable by trimellitic carboxyl potentials with or without added ZnO.

Example 1.—Laminate

In the preparation of this laminate a coating solution was first prepared as follows:

(I)

115.0 grams Example B resin (II)

118.5 grams dimethylacetamide (III)

17.4 grams ZnO (IV)

26.1 grams dimethylacetamide

Components (I) and (II) were ball milled for 20 hours and (III) and (IV) for 4 hours. The (III)–(IV) slurry was then added to (I)–(II) and grinding was continued for an additional hour.

This coating solution was used to impregnate four 7.0″ x 40.0″ strips of No. 181 glass fabric. This was done by drawing the strips through a small dip tank containing the solution and removing the excess by drawing between and through two stripper rods. The coated fabric was then dried for 30 minutes at 150° F. in a forced draft oven before cutting into 7.0″ x 9.0″ plies.

These were then pre-cured for 15 minute periods at 200, 250, 280 and 310° F. Fourteen of these plies were stacked between two aluminum foil covered plates and pressed as follows with 20 seconds venting out of each minute.

| Time, Minutes | Temp., °F. | Pressure, p.s.i. | Remarks |
| --- | --- | --- | --- |
| 0 | 500 | 25 | |
| 5 | 480 | 50 | |
| 10 | 520 | 100 | |
| 13 | 545 | 100 | First Extrusions. |
| 20 | 600 | 200 | |
| 32 | 650 | 200 | Stop Venting. |
| 60 | 650 | 200 | Heat off—cool. |

This press-cured laminate was then post-cured as follows without pressure:

22.0 hours, 350–550° F., foil wrapped
24.0 hours, 550–700° F., foil under charcoal
3.0 hours, 700–750° F., foil under charcoal
3.0 hours, 750–850° F., foil under charcoal The final composition of this post-cured laminate was as follows:

| | Percent |
| --- | --- |
| Glass fabric | 73.6 |
| ZnO | 4.1 |
| Resin | 22.3 |

Example 1 had a room temperature flexural before heat aging of 40,400 p.s.i. and a 700° F. flexural, after heating in air for 24 hours at 700° F. of 19,100 p.s.i.

Example 2.—Laminate

This product was prepared in a manner similar to Example 1 up to press curing except that Example C resin was used in making the following coating solution:

115.0 grams Example C resin
118.5 grams dimethylacetamide
17.4 grams ZnO
26.1 grams dimethylacetamide Processing of these components and application and pressure were identical to Example 1. Press cure was as follows—with 20 seconds venting each minute.

| Time, Minutes | Temp., °F. | Pressure, p.s.i. | Remarks |
| --- | --- | --- | --- |
| 0 | 500 | 50 | |
| 5 | 470 | 50 | |
| 10 | 510 | 50 | |
| 17 | 555 | 100 | Heat off—flowing. |
| 20 | 545 | 150 | |
| 23 | 535 | 200 | Heat on. |
| 35 | 605 | 200 | |
| 42 | 650 | 200 | Stop venting. |
| 60 | 650 | 200 | Heat off—cool. |

This laminate was post-cured in exactly the same manner as Example 1. The final composition of this laminate after post-cure was:

| | Percent |
| --- | --- |
| Glass fabric | 75.0 |
| ZnO | 4.0 |
| Resin | 21.0 |

Example 2 had a room temperature flexural before heat aging of 68,700 p.s.i., and a 700° F. flexural, after heating in air for 24 hours, at 700° F., of 51,900 p.s.i.

Example 3.—Laminate

This laminate was prepared from the following coating solution:

(I)

91.0 grams resin from Example D
74.0 grams dimethylacetamide (II)

38.2 grams trimellitic-imide-amide
76.4 grams dimethylacetamide (III)

11.0 grams ZnO
16.4 grams dimethylacetamide

Component (I) was prepared by dissolving the resin in dimethylacetamide at about 200° F. and then cooling. Component (II) was ball milled for 24.0 hours to a very fine dispersion. Component (III) was ball milled to a very fine dispersion. Then with good agitation, (II) was added to (I), followed by (III).

This solution was immediately used to impregnate glass fabric strips in exactly the same manner as in Example 1. After cutting into plies they were pre-cured for 30 minutes each at 200, 250 and 300° F. The 14.0–7.0″ x 9.0″ plies were stacked and pressed as follows, with 20 seconds venting each minute to 600° F.

| Time Minutes | Temp., °F. | Pressure, p.s.i. | Remarks |
| --- | --- | --- | --- |
| 0 | 530 | 200 | |
| 5 | 495 | 200 | |
| 10 | 530 | 200 | |
| 15 | 565 | 200 | |
| 20 | 600 | 200 | No more venting. |
| 30 | 600 | 200 | Heat off—cool. |

This laminate was post-cured in exactly the same manner as Example 1. The final composition after post cure was:

| | Percent |
| --- | --- |
| Glass fabric | 74.1 |
| ZnO | 2.3 |
| Resin | 23.6 |

Example 3 has a room temperature flexural of 75,700 p.s.i. before heat aging. After heat aging for 24 hours at 700° F., the flexural strength was 27,900 p.s.i. at 700° F.

The laminae, after coating with the curable resin in solution, need not be stacked, pressed and cured immediately, but to the contrary may be set aside for days at a time and then used to produce the laminate having the 700° F. flexural strength at 27,900 p.s.i. This ability to pre-impregnate, store, and then use the impregnated strata for binding to any other compatible strata is equally true of the resin of Examples 1 to 4. The resin does not have to be completely soluble in a solvent to be satisfactory for pre-impregnation, but should be at least fifty percent soluble in a commercial solvent such as dimethylacetamide, or more so if insolubles such as ZnO are added. The wetting and dispersion characteristics of the soluble fraction are important in preventing flocculation, settling and strain-out of the particulate material.

Example 4.—Laminate

This laminate was prepared from the following coating solution:

(I)

92.2 grams resin from Example D
120.0 grams dimethylacetamide (II)

52.2 grams trimellitic methylester (Acid No. 170) (91.8% solids)

(III)

8.0 grams ZnO
12.0 grams dimethylacetamide

Dissolve Example D in dimethylacetamide at 200° F. to make (I). Ball mill ZnO in dimethylacetamide for 4.0 hours to make (III). Then add (II) and (III) to (I) and mix well. Use solution immediately to impregnate glass fabric strips in exactly the same manner as in Example 1. The strips were dried for 30 minutes at 150° F. and then cut into 7.0″ x 9.0″ plies. These were pre-cured for 30 minutes each at 210, 260 and 310° F. Then fourteen of these plies were stacked between two aluminum foil covered steel plates and pressed as follows with 20 seconds vent out of each minute to 600° F.

| Time, Minutes | Temp., °F. | Pressure, p.s.i. | Remarks |
|---|---|---|---|
| 0 | 520 | 50 | |
| 5 | 495 | 50 | Flowing. |
| 10 | 525 | 50 | |
| 16 | 560 | 100 | |
| 21 | 590 | 200 | |
| 35 | 600 | 200 | No more venting. |
| 40 | 600 | 200 | Heat off—cool. |

This laminate was post-cured in exactly the same manner as Example 1. The final composition after post cure was:

Percent
Glass fabric _____ 73.5
ZnO _____ 1.8
Resin _____ 24.7

Example 4 had a room temperature flexural before heat aging of 72,100 p.s.i. After heat aging for 24.0 hours at 700° F. the flexural strength was 26,800 pounds at 700° F.

Example B produces, for comparison, the basic polybenzothiazole resin characterized by repeated units,

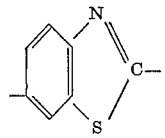

and these units are present in all the examples set forth. The end or terminal monomers of the molecule are unimportant from a structural standpoint, and may be of variant form as shown in Patent No. 3,047,543. Structurally, a substantially similar resin is produced under Example C and Example D, except that 4-aminophthalimide of Example C will introduce carboxyl potentials into the resin molecule, which are attached to some of the benzo portions of the resin molecule. These carboxyl potentials may be

where —X may be —OH, —SH, or —NH₂. With ortho aromatic diacids, of which 4-aminophthalimide is an example, the

group will be attached to the benzo ring ortho to the 2-thiazole carbon attachment.

The resin of Example B is similar to the polybenzothiazole resin of Patent No. 3,047,543 except that it is so processed as to provide usable solubility in dimethylacetamide. This resin, placed in slurry form (Example 1) together with zinc oxide, was used to impregnate glass fiber laminae serving as a resin bond. After cure, the lamination exhibited a flexural strength of about 19,000 p.s.i. at 700° F. However, the carboxylated resin, Example C, subjected to similar use in the presence of zinc oxide, produced a lamination about three times as strong, indicating the cure potential of the acid group with zinc in the resin molecule.

The acid or carboxylate group may be introduced into the resin molecule during or after formation of the basic polybenzothiazole resin, and in this sense I use the term "reacting" (the basic resin structure with a carboxyl potential) as applying to either mechanism from the standpoint of time. This is shown by Examples 3 and 4 where trimellitic compounds furnish carboxy groups which enter the resin molecule during cure.

Thus, it will be seen that a polybenzothiazole resin of improved oxidation resistance (greater flexural strength) is attained by incorporating 1,2 aromatic di-acid carboxyl potentials into the molecule. The di-acid potential may be 4-aminophthalimide,

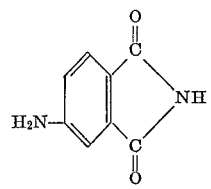

Example C, which has an —NH₂ group to participate in formation of the basic linking group,

requiring, of course, an atomic amount of sulfur in addition to the atomic amount of sulfur required by the toluidine or equivalent aromatic methyl amino compound used to form the basic polybenzothiazole repeating units,

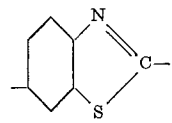

A tri-acid carboxyl potential may be used in which event the basic resin must be formed by using an aromatic diamine with two extra atom-parts of sulfur, Example D.

In the instance of Example C, carboxylation and formation of the polybenzothiazole molecule is believed to proceed as a simultaneous reaction; and in the instance of Examples 3 and 4 it is believed that the carboxyl potentials are introduced into the polybenzothiazole molecule by reaction of that molecule with the trimellitic compound after initial formation of the basic resin, Example D. Both procedures are contemplated by the terms of the claims.

Solubility of the curable resin in a commercially available solvent is necessary to a practical realization of pre-impregnation in practice, and this aim is attained by reacting the basic resin units with the compound presenting the carboxyl potential only to a point where a soluble resin of enhanced resistance to oxidation is formed, having sufficient solubility for easy impregnation of the strata to be coated which may thereafter be dried and set aside until time for use.

When reference is made to a "carboxyl potential," I am referring to a functional group derived from or which can be transformed into the carboxyl group or radical, —COOH. In the actual examples the carboxyl potentials presented by the compounds used to react with the basic, polybenzothiazole repeating units are

| Compound: | Carboxyl potential |
|---|---|
| 4-aminophthalimide | —CONH$_2$ |
| Trimellitic-imide-amide | CO—NH—CO—CONH$_2$ |
| Trimellitic methylester | —COOCH$_3$—COOCH$_3$ —COOCH$_3$ |

Some of these carboxyl potentials will be consumed in thiazole formation whereas others may become involved in other reactions which will ultimately increase the resistance of the basic benzothiazole resin to thermal oxidation. In any event, it is the excess of carboxyl potentials not consumed in benzothiazole formation which contributes to the finally cured product a degree of oxidation resistance not obtainable with the basic resin alone. This improvement in thermal stability is manifest in the flexural data set forth above. The exact chemical mechanism whereby this improved performance is accomplished is not clearly understood at present but is dependent upon the addition and placement of the specified carboxyl potentials. The exact role of zinc oxide in the cure has not been clearly established.

It will be realized from the foregoing that other compounds presenting a carboxyl potential immediately suggest themselves such as pyromellitic di-imide and pyromellitic tetramethylester, and hence compounds other than those of the examples herein may be used as a source of carboxyl potential. In fact, not only is it possible to introduce the carboxyl potential directly, as in the examples, but active potentials may be formed during the course of resin formation, as by oxidizing methyl groups in the presence of excess sulphur.

Prior work by Dr. A. A. Morton and myself established that Morton's concept of the inclusion of carboxyl potentials as well as zinc oxide would improve the oxidative stability of the basic polybenzothiazole resin. Glass fabric laminates bonded therewith exhibited room temperature flexural strengths of about 71,000 p.s.i.; but when tested at 600° F. the flexural strength dropped to about 38,000 p.s.i., a retention factor of about 54%. Moreover, the insolubility of the resin and consequent flake-off rendered the system wholly unsuitable for any practical use.

Under my invention, the polybenzothiazole resin containing the carboxyl potentials is rendered at least partially soluble (e.g. in dimethylacetamide) which enables the resin to substantially uniformly impregnate reinforcing plies without appreciable strain-out and flake-off of insoluble portions. Thus, I afford practical utilization, and in addition, the final product possesses superior oxidative stability in that flexural strength of bonded laminae (38,000 p.s.i. after 192 hours at 600° F.) is increased to at least 47,000 p.s.i. under the same conditions which represents a 75% retention of room temperature strength. I achieve solubility simply by reacting the polybenzothiazole molecule with increments of the carboxyl potential added over a period of about two and one-half hours (Example C) while raising and then lowering the temperature of the reactants in the range of 350° F. and 400° F., and when all the carboxyl potential has been added, the mixture is held at about 400–420° F. for about eleven hours, resulting in the desired end product being partially soluble in dimethylacetamide.

Hence, while I have described and claimed the preferred embodiment of my invention, it is to be understood that resort may be had to equivalent reactants and procedures.

I claim:

1. A method of forming a heat resistant resin comprising, reacting polybenzothiazole having the repeating unit structure

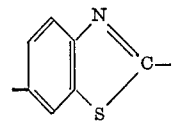

with 4-aminophthalimide presenting a carboxyl potential in excess of that consumed in benzothiazole formation, the imide being added to the resin increments while raising and lowering the temperature in the range of about 350° to 400° over a period of about two and one-half hours, and after all the imide is added holding the temperature of reaction at about 400° F. to 420° F. for about eleven hours until a resin is produced which is at least partially soluble in dimethylacetamide.

2. A method according to claim 1 including the additional steps of dissolving the resin and applying the solution as a bonding coating on a substrate.

3. A method according to claim 1 in which the heat resistant resin is formed by reacting the 4-aminophthalimide in increments as specified in claim 1 with a reacting mixture of sulphur and mixed toluidines which form the repeating benzothiazole structure of claim 1.

References Cited

UNITED STATES PATENTS

| 3,047,543 | 7/1962 | Morton et al. | 260—79 |
| 3,260,700 | 7/1966 | Rudner et al. | 260—79 |
| 3,324,086 | 6/1967 | Preston | 260—79 |

DONALD E. CZAJA, *Primary Examiner.*

M. I. MARQUIS, *Assistant Examiner.*